United States Patent [19]
Te Dorsthorst et al.

[11] Patent Number: 5,354,231
[45] Date of Patent: Oct. 11, 1994

[54] DEVICE FOR REMOVING THE ANUS OF SLAUGHTERED ANIMALS

[75] Inventors: Wilhelmus A. B. Te Dorsthorst; Sander A. Van Ochten, both of Lichtenvoorde; Fransiscus M. Waanders, Haaksbergen, all of Netherlands

[73] Assignee: Stork R.M.S. B.V., Lichtenvoorde, Netherlands

[21] Appl. No.: 75,480

[22] PCT Filed: Sep. 11, 1992

[86] PCT No.: PCT/NL92/00157
§ 371 Date: Sep. 22, 1993
§ 102(e) Date: Sep. 22, 1993

[87] PCT Pub. No.: WO93/07759
PCT Pub. Date: Apr. 29, 1993

[30] Foreign Application Priority Data

Oct. 17, 1991 [NL] Netherlands ............... 9101742

[51] Int. Cl.$^5$ ............................................. A22B 5/00
[52] U.S. Cl. ....................................... 452/122; 452/109
[58] Field of Search ......................... 452/122, 120, 109

[56] References Cited

U.S. PATENT DOCUMENTS

| | | | |
|---|---|---|---|
| 4,087,886 | 5/1978 | Aubert | 452/122 |
| 4,779,307 | 10/1988 | van der Hoorn et al. | 452/122 |
| 5,112,272 | 5/1992 | Andersen | 452/122 |
| 5,120,266 | 6/1992 | Aubert | 452/120 |
| 5,141,471 | 8/1992 | Bekkers | 452/122 |

FOREIGN PATENT DOCUMENTS

| | | |
|---|---|---|
| 0258939 | 3/1988 | European Pat. Off. |
| 0398338 | 11/1990 | European Pat. Off. |
| 2640465 | 6/1990 | France |
| 7606104 | 12/1976 | Netherlands |
| WO89/10060 | 11/1989 | PCT Int'l Appl. |

*Primary Examiner*—Willis Little
*Attorney, Agent, or Firm*—Willian Brinks Hofer Gilson & Lione

[57] ABSTRACT

A device for removing the anus of slaughtered animals, which device comprises: a cutting device (14) for cutting out the anus (9) of a slaughtered animal transported by the transporting means (10, 11, 12), which cutting device comprises: a displaceable carriage (24); and a rotatably drivable and axially displaceable, substantially cylindrical blade (32) carried by this carriage (24) and having a leading cutting edge and a blunt locating pin (33) placed coaxially of this blade (32), wherein during removal of an anus (9) the centreline (34) of the blade (32) is substantially stationary relative to the slaughtered animal being processed, is characterized by positioning means for positioning the carriage (24) such that the centreline (34) of the blade (32) extends through the anus (9) of the slaughtered animal, which positioning means comprise two drives which can move the carriage in two respective non-parallel directions; measuring means for measuring the position of the anus of a slaughtered animal for processing; and control means which receive position information from the measuring means and control the two drives on the basis thereof.

20 Claims, 2 Drawing Sheets

DEVICE FOR REMOVING THE ANUS OF SLAUGHTERED ANIMALS

BACKGROUND OF THE INVENTION

The invention relates to a device for removing the anus of slaughtered animals, which device comprises:

a cutting device for cutting out the anus of a slaughtered animal transported by the transporting means, which cutting device comprises:

a displaceable carriage; and a rotatably drivable and axially displaceable, substantially cylindrical blade carried by this carriage and having a leading cutting edge and a blunt locating pin placed coaxially with this blade, wherein the centre line of the blade during removal of an anus is substantially stationary relative to the slaughtered animal being processed.

Such a device is disclosed in the following prior art. NL-A-7606104 relates to a device wherein the carriage can swing in a vertical plane.

FR-A-2 640 465 likewise relates to a device wherein the carriage can perform a swinging movement relative to a fixed pivot line.

Both cited publications relate to a technique wherein the carriage can perform a horizontal displacement and can perform a swinging movement in the vertical plane relative to a subsequently selected new horizontal position. Once a desired position is reached the rotatably driven cylindrical blade is displaced forward along its centre line to cut out the anus.

The art according to both mentioned publications is found to provide an insufficiently accurate positioning, wherein "misses" occur regularly. Such an error has the consequence that contamination of usable meat of the slaughtered animal can arise or that usable meat is cut away by the cutting device, while it is possible that the anus for removal is not completely cut out. The device for removing the anus can form part of a slaughter house line at a processing stage in which the rough pro-processing has . already taken place, such as killing the animal and removing hair and cleaning. The device therefore forms part of the so-called "clean" slaughter line, in which errors are not acceptable.

EP-A-0 259 939 relates to a device in which the slaughtered animal is mechanically positioned relative to the cutting device. A pivotal movement of the cutting device in a vertical plane also takes place here.

WO-A-89/10060 relates to a device wherein a pig is placed and held in a determined position, the cutting device is then moved vertically and can subsequently pivot in vertical plane round a pivot axis.

SUMMARY OF THE INVENTION

All four of the above mentioned publications have in common that the positioning accuracy leaves something to be desired. This inaccuracy implies that for variously dimensioned animals (thin-fat; long-short) the cutting operation can take place at a position other than the one desired.

The invention has for its object to embody a device of the stated type such that the chance of errors is almost negligible.

For this purpose the device according to the invention is characterized by positioning means for positioning the carriage such that the centre line of the blade extends through the anus of the slaughtered animal, which positioning means comprise two drives which can move the carriage in two respective non-parallel directions;

measuring means for measuring the position of the anus of a slaughtered animal for processing; and control means which receive position information from the measuring means and control the two drives on the basis thereof.

In a preferred embodiment the device has the feature that the two directions are substantially mutually perpendicular. This ensures that the two directions are independent, which means that the displacement in the one direction does not affect the displacement in another direction.

This embodiment can advantageously have the characteristic that the two directions are respectively substantially vertical and horizontal. With the horizontal drive the carriage can be displaceable from and to the transport device. Because an exclusively horizontal movement does not change the potential energy of the carriage, the horizontal drive can have a limited power and take a light form. The required power is then only determined by the required accelerations.

In a particular embodiment the device is characterized by a drive arranged on the carriage for axially moving the blade.

Such a separate drive can be entirely dispensed with in an embodiment in which the axial movement of the blade takes place through simultaneous, adapted energizing of the two drives.

It occurs regularly that due for example to a wound a tail of a slaughtered pig assumes a position such that prior to the cutting operation it is situated between the anus and the cutting device. In order also in such a case to enable the positioning and the cutting operation to be performed with the desired great reliability the device can display the feature that the control means first actuate the horizontal drive and then the vertical drive. In this case the centre line of the blade passes over the tail first, only thereafter to reach its final position from a side where the tail no longer interferes.

Attention is otherwise drawn to the fact that, subject to the conditions detected by the measuring means, a simultaneous movement of the vertical and the horizontal displacement is also possible.

The measuring means can be of any suitable and per se known type. Use can for instance be made of one or more mechanical sensors. However, to avoid any possible contamination, preference is generally given to for example optical or ultrasonic sensors.

The time required for processing the animal with the device can be gained by means of means for causing the cutting device to move together with the transport device during operation of the cutting device.

In addition to a direct measurement an indirect measurement of the position of the anus of a slaughtered animal is also possible within the scope of the invention. For this purpose the invention can for example have the characteristic that the measuring means comprise detecting means for detecting at least one body part of a slaughtered animal which has a known spacial position relative to the position of the anus, for example one or more (hind) legs, the tail, the groin area, etc.

DETAILED DESCRIPTION OF THE DRAWINGS

Figure 1:
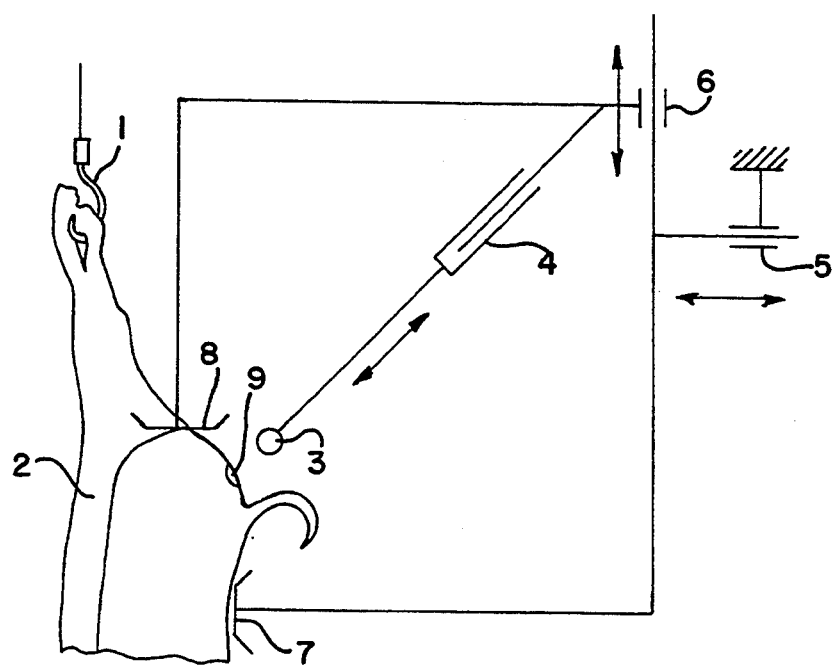
FIG. 1 shows a highly schematized side view of a device according to the invention.

FIG. 1 shows that a pig 2 is suspended from its hind legs by means of suspension hooks 1. A cutting device 3 is movable at a fixed direction of entry by means of a linear drive 4. The drive 4 with the cutting device 3 form part of a carriage which is movable in the horizontal plane by a horizontal guiding 5 and associated drive means (not drawn). The carriage further bears a vertical guiding 6 with associated drive (not drawn) for displacing the cutting device 3 vertically so that it is carried into a position relative to the sensor 7 of the slaughtered pig 2 such that the centre line of the cutting device 3 extends to the anus of the slaughtered animal 2.

Schematically designated positioning sensors 7 and 8 determine the desired position.

Figure 2:
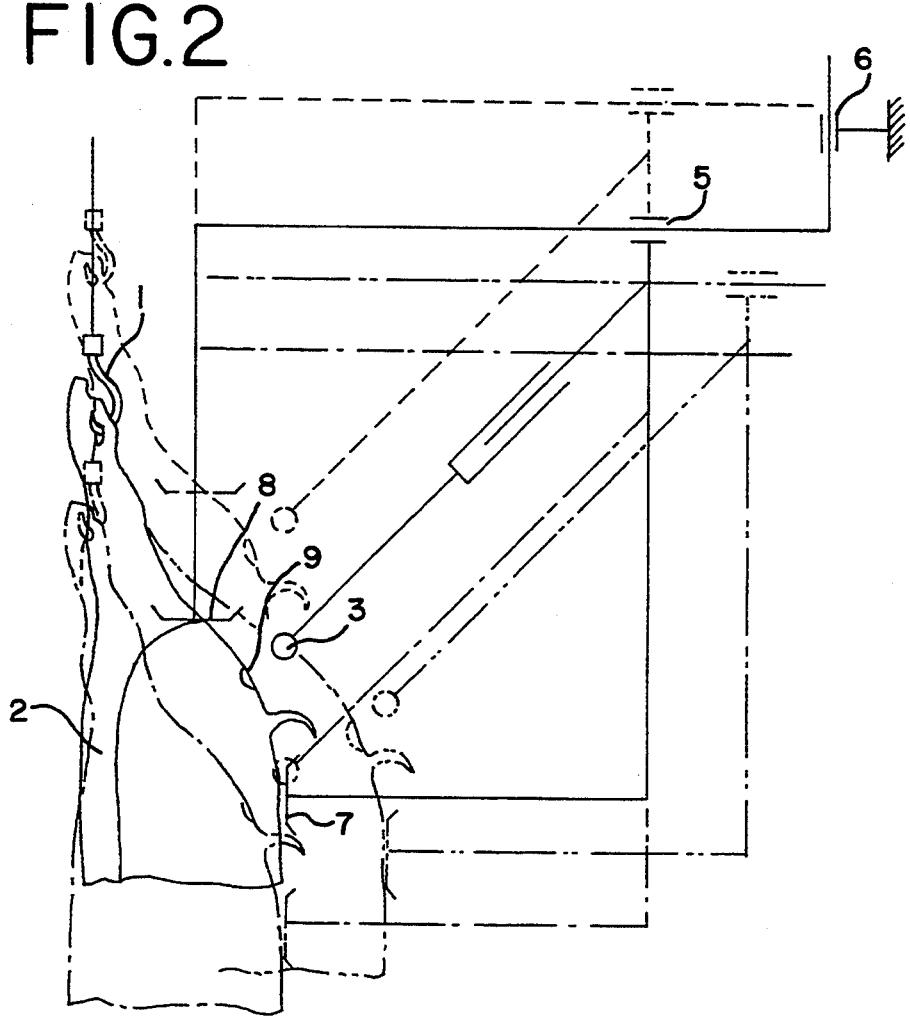
FIG. 2 shows a second embodiment in highly schematic side view.

In the embodiment according to FIG. 2 the unit 3, 4, 5, 7, 8 is vertically displaceable in its entirety via the vertical guiding 6 while the movement of the cutting device with the linear drive 4 takes place by means of the horizontal guiding 5.

FIG. 2 shows that it is always possible, irrespective of the dimensioning of the pig 2 (long, short; thin, fat), to place the cutting device 3 in the correct position relative to the anus 9.

Figure 3:
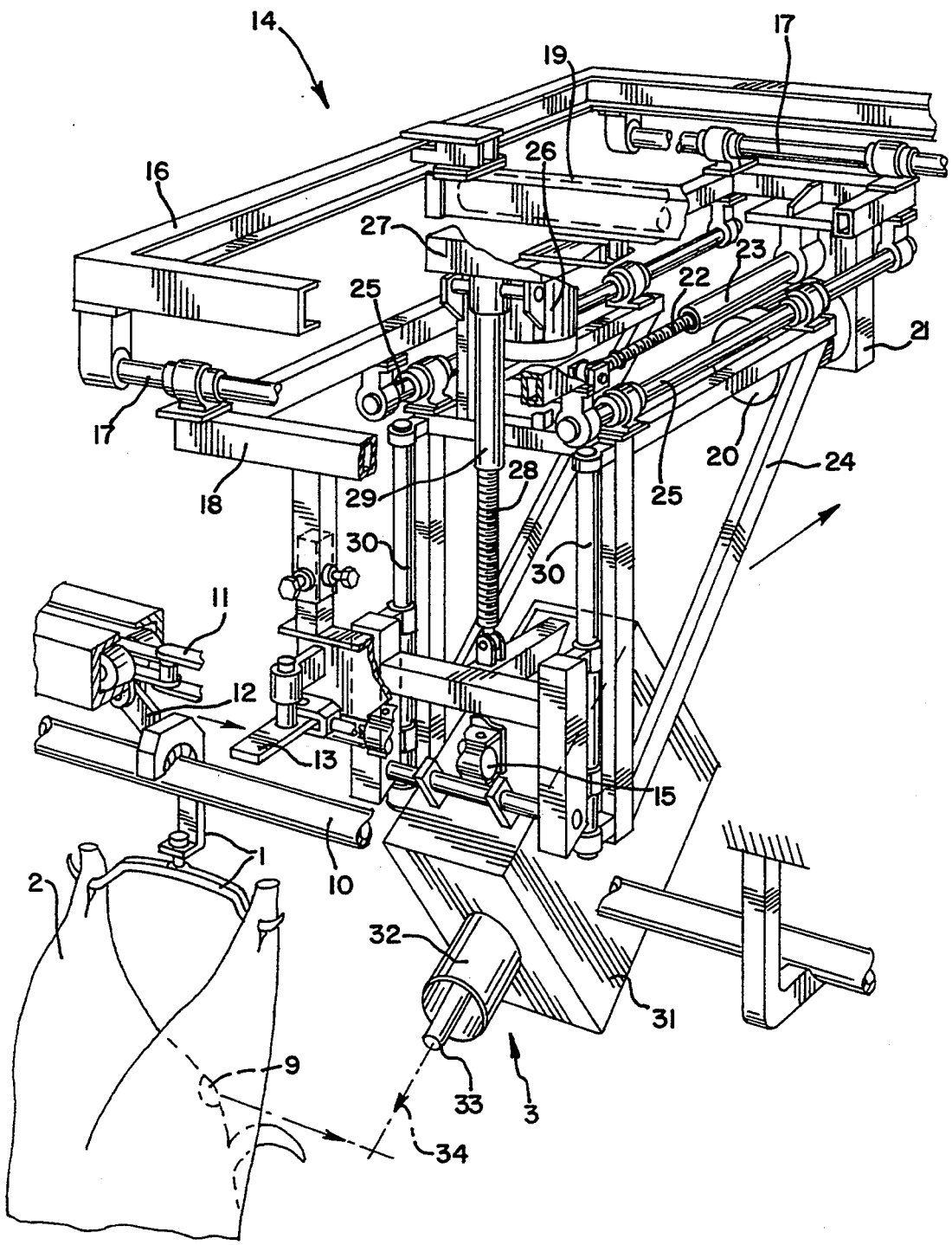
FIG. 3 shows a partially broken away perspective view of the device according to FIG. 1.

FIG. 3 shows the hook 1 which is slidable along a rail 10 and is driven by a drive chain 11 by means of carriers 12. The device 14 according to the invention can be carried along by the hook 1 by means of a carrier 13 such that during the cutting operation by the cutting device 14 the animal 2 stands still in relation to the device. After completion of the cutting operation the carrier 13 can return the point of the hook 1 to its initial position in both directions of the drive 15.

A fixed frame 16 supports via guides 17 an auxiliary frame 18 that is movable in lengthwise direction of the rail 10 by means of a linear drive 19. This drive serves for the horizontal movement of the auxiliary frame 18 along the rail 10.

A motor 20 drives via a transmission 21 a screw spindle 22 which, by means of an associated pipe with internal threading 23, horizontally drives a carriage 24 in a direction from and to the rail 10. The guiding takes place via horizontal guides 25 which correspond with the guide 5 as according to FIG. 1.

The vertical mobility is obtained by means of a motor 26, an associated transmission 27 and a screw spindle 28 with pipe 29 with internal screw thread. Guides 30 ensure the vertical guiding and correspond with the vertical guide 6 according to FIG. 1.

The carriage 24 bears the cutting device 14. Situated in the casing 31, from which protrudes a cylindrical blade 32 with blunt locating pin 33, is a drive motor for the blade 32 in addition to a linear drive to set the blade into motion in axial direction 34. It is pointed out in this respect that for the sake of the clarity of the drawing the pig 2 is not shown in the cutting position relative to the blade 32.

Not drawn here are measuring means for measuring the position of the cutting device relative to the anus 9, or the control means which process the output signals of these measuring means into control signals for the respective motors and drives.

We claim:

1. An apparatus for removing the anus of slaughtered animals, comprising:

a cutting device for cutting out the anus of a slaughtered animal, which cutting device comprises a displaceable carriage and a rotatably drivable and axially displaceable, substantially cylindrical blade carried by the carriage and having a leading cutting edge and a blunt locating pin placed coaxially to the blade, wherein during removal of an anus a centre line of the blade is substantially stationary relative to the slaughtered animal being processed;

a positioning device for positioning the carriage such that the centre line of the blade extends through the anus of the slaughtered animal, which positioning device comprises two drives which can move the carriage in two respective non-parallel directions;

a measuring device for measuring the position of the anus of the slaughtered animal for processing; and a control device which receives position information from the measuring device and controls the two drives on the basis of the position information.

2. The apparatus as claimed in claim 1, wherein the two directions are substantially mutually perpendicular.

3. The apparatus as claimed in claim 2, wherein the two directions are, respectively, substantially vertical and substantially horizontal.

4. The apparatus as claimed in claim 1, wherein the apparatus further comprises a drive arranged on the carriage for axially displacing the blade.

5. The apparatus as claimed in claim 1, wherein the axial displacement of the blade takes place through simultaneous, adapted energizing of the two drives.

6. The apparatus as claimed in claim 3, wherein the control device first actuates the horizontal drive and then the vertical drive.

7. The apparatus as claimed in claim 1, the apparatus further comprising:

a transporting mechanism for transporting an animal for processing; and a mechanism for causing the cutting device to move together with the transporting mechanism during operation of the cutting device.

8. The apparatus as claimed in claim 1, wherein the measuring device comprises a detecting device for detecting at least one body part of a slaughtered animal.

9. An apparatus for removing the anus of a slaughtered animal, the apparatus comprising:

a displaceable carriage comprising a cutting device for cutting out the anus of a slaughtered animal;

a positioning device comprising two drives disposed so as to move the carriage in two respective non-parallel directions;

a measuring device for measuring the position of the anus of the slaughtered animal; and a control device which receives the position of the anus from the measuring device and which controls the two drives on the basis of that position to position the carriage such that the center line of a blade comprising the cutting device extends through the anus of the slaughtered animal.

10. The apparatus of claim 9 further comprising a drive associated with the cutting device for axially displacing the blade.

11. The apparatus of claim 9 wherein the axial displacement of the blade takes place through simultaneous, adapted energizing of the two drives.

12. The apparatus of claim 9 wherein the control device first actuates a substantially horizontally disposed drive and then a substantially vertically disposed drive.

13. The apparatus of claim 9 wherein the two drives are each driven by a dedicated motor.

14. The apparatus of claim 9 wherein the measuring device comprises an optical sensor.

15. The apparatus of claim 9 wherein the measuring device comprises an ultrasonic sensor.

16. An apparatus for removing the anus of a slaughtered animal, the apparatus comprising:

a displaceable carriage comprising a cutting device for cutting out the anus of a slaughtered animal;

a positioning device comprising at least two drives which are disposed so as to move the carriage in two respective non-parallel directions;

a measuring device for measuring the position of the anus of the slaughtered animal; and a control device which receives the position of the anus from the measuring device and which controls the at least two drives on the basis of that position to position the carriage such that the cutting device can remove the anus of the slaughtered animal.

17. The apparatus of claim 16 wherein the control device positions the carriage such the center line of a blade comprising the cutting device extends through the anus of the slaughtered animal.

18. The apparatus of claim 16 further comprising a drive associated with the cutting device for displacing the cutting device.

19. The apparatus of claim 18 wherein a center line of a blade comprising the cutting device is aligned to extend through the anus of the slaughtered animal through rotation of the cutting device.

20. The apparatus of claim 18 wherein the drive associated with the cutting device for displacing the cutting device is disposed so as to axially displace a blade comprising the cutting device.

* * * * *